Patented July 13, 1954

2,683,698

UNITED STATES PATENT OFFICE 2,683,698

STABLE EMULSIONS OF HYDROCARBON POLYMERS AND METHOD OF MAKING THE SAME

Jack H. Bates, Bay City, Mich., assignor to The Dow Chemical Company, Midland, Mich., a corporation of Delaware No Drawing. Application November 14, 1952, Serial No. 320,620

9 Claims. (Cl. 260—29.6)

This invention concerns a method and agents for stabilizing aqueous compositions containing polymers of monovinyl aromatic hydrocarbons, and particularly copolymers of a predominant amount of a monovinyl aromatic hydrocarbon with a minor proportion of an aliphatic conjugated diolefin, against deterioration in contact with metal surfaces. It relates more particularly to a method and agents for suppressing the tendency of aqueous colloidal dispersions of copolymers of a monovinyl aromatic hydrocarbon and butadiene to deteriorate in contact with metal surfaces, e. g. iron. The invention also pertains to the stabilized aqueous compositions.

Synthetic latexes of polymers of monovinyl aromatic hydrocarbons, e. g. styrene, or copolymers of monovinyl aromatic hydrocarbons with aliphatic conjugated diolefins such as butadiene-1,3, or isoprene, and methods of making the same are well known. It is also known that synthetic latexes or aqueous colloidal dispersions of copolymers of unsaturated hydrocarbons, e. g. a copolymer of from 40 to 60 per cent of monovinyl aromatic hydrocarbon and from 60 to 40 per cent of butadiene-1,3, can be applied to surfaces of wood, iron, concrete, or solid plastic articles, and dried to form films or protective coatings. Such aqueous emulsions of polymers are also useful in the manufacture of water-emulsion paints, as is described in U. S. Patent No. 2,498,712.

It has been observed that synthetic latexes, or aqueous colloidal dispersions of polymers of one or more monovinyl aromatic hydrocarbons, and particularly copolymers of a major proportion of a monovinyl aromatic hydrocarbon and a minor proportion of an aliphatic conjugated diolefin, e. g. butadiene, tend to deteriorate during storage in contact with metal surfaces, particularly iron or steel. Such base metals, coated, or plated, with other metals such as tin, lead, or zinc, also tend to cause deterioration of the aqueous colloidal dispersions of the polymers, or, stated conversely, the aqueous colloidal dispersions tend to corrode such metals and in turn deteriorate upon prolonged storage in contact therewith. The aqueous colloidal dispersions of the polymers tend to plate out, i. e. form a nodule or button of the solid polymer or copolymer, on metal surfaces in contact with the liquid. The dispersion of the polymer or copolymer in the aqueous medium usually coagulates as a nodule of solid polymer on inner surfaces of the metal container at, or below, the surface of the liquid. The nodule of polymer tends to increase in size upon standing, e. g. during storage in iron or steel containers, and may grow to such proportions as to result in complete solidification or coagulation of the aqueous colloidal dispersion upon prolonged storage. Also, when a metal container such as an iron or steel drum, or iron coated with tin, lead, or zinc, is only partly filled with an aqueous emulsion of such polymers or copolymers, the inner surfaces of the container above the liquid tend to corrode or rust which increases the tendency toward coagulation or deterioration of the aqueous colloidal dispersion, or may result in failure or leakage of the container. The characteristics of aqueous colloidal dispersions or latexes of the polymers, or of compositions such as latex paints containing the dispersed polymers, to plate out, and to corrode metals, e. g. iron, or steel, is particularly troublesome in shipping and storing of the aqueous compositions.

I have now discovered that an aqueous colloidal dispersion, i. e. a synthetic latex, of a polymer of one or more monovinyl aromatic hydrocarbons of the benzene series, or of a copolymer of a major proportion of at least one such monovinyl aromatic hydrocarbon and a minor proportion of an aliphatic conjugated diolefin such as butadiene, which aqueous colloidal dispersion has a substantially neutral to alkaline pH value incident to its manufacture, can readily be stabilized to prevent, or reduce the extent of plating out or coagulation during storage in contact with metals by incorporating with the aqueous colloidal dispersion a small amount, suitably from 0.4 to 2 per cent by weight, based on the weight of the polymer, of sodium azide, together with small amounts of an alkali metal bicarbonate and an alkali such as ammonium hydroxide, sodium hydroxide, or potassium hydroxide, as hereinafter specified.

I have further found that the stabilized aqueous colloidal dispersions or synthetic latexes of the polymers, or aqueous compositions, e. g. a latex paint, containing the latexes, are also less corrosive to metals such as iron, or steel, or such metals plated with tin, zinc, or lead, than are the latexes or aqueous compositions in the absence of the stabilizing ingredients.

The method may be used to stabilize aqueous colloidal dispersions or synthetic latexes of homopolymers or copolymers of one or more monovinyl aromatic hydrocarbons such as styrene, meta-methylstyrene, ortho-methylstyrene, para-methylstyrene, ortho-ethylstyrene, meta-ethylstyrene, para-ethylstyrene, meta-isopropylstyrene, para-isopropylstyrene, ar-methyl-ar-ethylstyrene, ar-dimethylstyrene, or ar-methyl-ar-isopropylstyrene. A synthetic latex of a copolymer of any one or more of such monovinyl aromatic compounds and not more than 50 per cent by weight of an aliphatic conjugated diolefin containing from 4 to 6 carbon atoms in the molecule, such as butadiene or isoprene, can also be rendered stable to deteriorating upon prolonged contact with metals such as iron, or steel, or such metals plated with zinc, lead or tin, by incorporating with the latex, based on the weight of the copolymer, from 0.4 to 2 per cent by weight of sodium azide, together with from 0.4 to 2 per cent of an alkali metal bicarbonate such as sodium bicarbonate or potassium bicarbonate, and at least 0.1 per cent of an alkali, e. g. ammonium hydroxide, to form an aqueous composition having a pH value between 9 and 12.

Latex paints containing aqueous colloidal dispersions of copolymers of a major proportion of one or more monovinyl aromatic hydrocarbons and a minor proportion of one or more aliphatic conjugated diolefins such as butadiene, or isoprene, are likewise rendered stable to plating out, or to corroding of the container, during prolonged storage in contact with metal, e. g. during storage in iron drums or steel tanks, by incorporating with the latex paint an amount of sodium azide corresponding to from 0.4 to 2 per cent by weight, on a dry basis, of the copolymer in the composition, together wit han alkali metal bicarbonate and an alkali in the aforementioned proportions.

I have found that the sodium azide, together with the alkali metal bicarbonate and the alkali, are most effective in stabilizing aqueous colloidal dispersions of the polymers, or aqueous compositions containing the dispersed polymers, when such aqueous colloidal dispersions, or compositions, have a hydrogen ion concentration incident to the manufacture thereof such that the aqueous compositions are substantially neutral, i. e. have a pH value of 6 or above. It may be mentioned that aqueous colloidal dispersions or synthetic latexes of polymers and copolymers of monovinyl aromatic hydrocarbons with one another or with aliphatic conjugated diolefins, e. g. butadiene, vary somewhat from batch to batch, even between successive batches of the materials made under seemingly similar polymerization conditions, with regard to their stability to plating out upon storage in contact with metal surfaces, or to corroding of metal surfaces. Accordingly, the proportions of the stabilizing ingredients hereinbefore mentioned that are required to render a particular synthetic latex stable to plating out, or to corroding of a metal such as iron, will vary somewhat depending upon the inherent characteristics of the latex incident to its manufacture. No specific proportions of the stabilizing ingredients can be stated which are equally operable with all latexes of the type herein described. However, a small proportion, i. e. a stabilizing amount, of each of the ingredients, sodium azide, an alkali metal bicarbonate, e. g. sodium bicarbonate or potassium bicarbonate, and an alkali such as ammonium hydroxide, sodium hydroxide, or potassium hydroxide, within the range of the proportions of said ingredients herein specified has been found to give satisfactory results.

The aqueous colloidal dispersion, or synthetic latex, of the polymer to be stabilized should contain at least 30 per cent by weight or more of the polymer, and preferably contains from 40 to 50 per cent by weight of the polymer or copolymer, dispersed in the aqueous phase thereof. In general, aqueous colloidal dispersions containing lesser amounts, e. g. from 10 to 20 per cent by weight, of the polymer have improved stability when treated with the stabilizing ingredients, but are not rendered as stable to plating out, or to corroding of the container, when stored in contact with metals such as iron, or iron coated with tin, lead, or zinc, for prolonged periods of time as are the aqueous colloidal dispersions containing a higher proportion of the polymer.

It is important in stabilizing the aqueous colloidal dispersions, or synthetic latexes, having a substantially neutral to alkaline pH value incident to their manufacture, that the sodium azide, the alkali metal bicarbonate, e. g. sodium bicarbonate, or potassium bicarbonate, and the alkali such as ammonium hydroxide, sodium hydroxide, or potassium hydroxide, be employed in conjunction with each other as the essential stabilizing ingredients and in the relative proportions, based on the weight of the polymer, of from 0.4 to 2 per cent by weight of the sodium azide, from 0.4 to 2 per cent by weight of the alkali metal bicarbonate and the alkali in amount of at least 0.1 per cent by weight, to form an aqueous composition having a pH value between 9 and 12. Aqueous colloidal dispersions of the polymers or copolymers having a pH value incident to their manufacture slightly below neutral, e. g. a pH value of 6, may first be treated with an aqueous solution of an alkali such as sodium hydroxide or ammonium hydroxide, preferably the latter, to bring the aqueous colloidal dispersion to a slightly alkaline pH value, prior to incorporating the stabilizing ingredients therewith. Satisfactory results are usually obtained by incorporating the sodium azide and the alkali metal bicarbonate with the substantially neutral to alkaline aqueous colloidal dispersion and thereafter adding the alkali in the desired proportion. Although the aqueous colloidal dispersion to be stabilized may have an alkaline pH value, e. g. a pH value of 10 or more, incident to its manufacture, the addition of a further small amount of an alkali such as ammonium hydroxide, sodium hydroxide, or potassium hydroxide, thereto, together with the sodium azide and the alkali metal bicarbonate in the aforementioned proportions, enhances the effect of the other ingredients over that provided by the alkali in the latex as manufactured. The manner in which the added alkali augments the stabilizing effect of the combination is not known.

Neutral to alkaline aqueous colloidal dispersions of the aforementioned polymers are prepared by polymerizing the corresponding monomeric compounds, e. g. styrene, or a mixture of styrene and butadiene, in accordance with known procedures. Usually the polymerizable material is admixed with an aqueous solution of an emulsifying agent and the mixture is agitated to effect emulsification. A variety of suitable emulsifying agents such as Aquarex D (sodium sulfate esters of higher alcohols, principally lauroyl and myristic alcohols), Duponol ME (sodium sulfate ester of lauroyl alcohol), Santomerse A (dodecyl benzene sodium sulfonate), or sodium oleate, are known to the art. The emulsifying agent is usually employed in amount corresponding to from 0.5 to 5 per cent by weight of the polymerizable monomeric materials, but it may be used in smaller or larger proportions. A polymerization catalyst such as hydrogen peroxide, benzoyl peroxide, sodium perborate, cumene hydroperoxide, or potassium persulfate, is usually added in amount corresponding to from 0.1 to 4 per cent of the weight of the compounds to be polymerized, together with a small amount, e. g. from 0.01 to 1 per cent by weight, of a weak alkali or a basic salt such as sodium bicarbonate, potassium bicarbonate, sodium tetraborate, or tetrasodium pyrophosphate, to maintain the emulsion neutral or substantially neutral. The emulsion is usually heated in a closed container, preferably with agitation, at temperatures between 50° and 100° C. to effect polymerization.

Upon completion of the polymerization, minor amounts of emulsifying agents such as Santomerse A (dodecyl benzene sodium sulfonate), Aquarex D (monosodium sulfate esters of higher alcohols, principally lauroyl and myristic alcohols), or Duponol ME (sodium sulfate ester of lauroyl alcohol), or monoethanolamine oleate, may be incorporated with the raw latex to improve the mechanical stability. Such added ingredients are suitably incorporated with the latex in usual ways, e. g. by forming a solution of the monoethanolamine oleate and a solvent or dissolving the emulsifying agent in water, and adding the solution to the raw latex. The added ingredients are usually employed in amounts corresponding to from 0.5 to 3 parts by weight per 100 parts by weight of the polymer in the latex, but smaller or larger amounts may be used. The aqueous colloidal dispersion is usually treated, or purged, with superheated steam to distill off unreacted monomers, although such treatment is not required.

In practice of the invention, such neutral to alkaline aqueous colloidal dispersion of a polymer or copolymer is stabilized, i. e. rendered stable to plating out or coagulating and rendered substantially non-corrosive to iron or steel, by admixing therewith a stabilizing amount of the sodium azide, the alkali metal bicarbonate, e. g. sodium bicarbonate or potassium bicarbonate, and the alkali such as ammonium hydroxide, potassium hydroxide, or sodium hydroxide, within the range of proportions herein specified. The sodium azide is suitably added to the aqueous colloidal dispersion as an aqueous solution containing from 5 to 25 per cent by weight or more of the sodium azide. The alkali metal bicarbonate is usually added as an aqueous solution containing from 5 to 10 per cent by weight of the same. The alkali is preferably ammonium hydroxide and is usually employed as an aqueous solution containing approximately 28 per cent by weight of ammonium hydroxide. Aqueous solutions of sodium hydroxide or potassium hydroxide in concentrations of from 5 to 10 per cent by weight or more of the alkali may satisfactorily be used. The sodium azide and the alkali metal bicarbonate are usually incorporated with the aqueous colloidal dispersion of the polymer in the desired proportions, after which the alkali is added in the desired proportion and in amount such as to bring the resulting aqueous colloidal dispersion to a pH value between 9 and 12.

Latex paints may be prepared by incorporating with a stabilized aqueous synthetic latex of a copolymer of a monovinyl aromatic hydrocarbon and butadiene, added ingredients, comprising one or more pigments such as titanium oxide, white lead, china clay, or zinc sulfide, and usually a protective colloid such as a partially saponified polymer of vinyl acetate, or a water-soluble cellulose ether, e. g. methyl cellulose, or hydroxyethyl cellulose. Usually the paint is prepared so as to contain from 15 to 100 parts by weight of the copolymer per 100 parts of pigment. The stabilizing ingredients may be incorporated with the latex prior to adding the pigment, or the stabilizing ingredients may be incorporated with the latex paint.

The following examples illustrate ways in which the principle of the invention has been applied but are not to be construed as limiting the invention.

*Example 1*

A charge of 60 parts by weight of isomeric vinyltoluenes and 40 parts by weight of butadiene, together with 100 parts by weight of an aqueous solution containing 0.13 per cent by weight of Aquarex D (the monosodium sulfate esters of higher fatty alcohols, principally lauroyl and myristic aclohols) as emulsifying agent, 0.09 per cent of sodium bicarbonate and 0.16 per cent of potassium persulfate as polymerization catalyst was placed in a closed vessel. The vinyltoluene employed in the experiment was a mixture of approximately 70 per cent by weight of meta-vinyltoluene and 30 per cent paravinyltoluene. The mixture of the monomeric vinyltoluenes, the butadiene and the aqueous solution was agitated to effect emulsification, and was heated at a temperature of 80° C. for a period of 16 hours to polymerize the monomers. A synthetic latex was obtained. It was removed from the reaction vessel and was treated with superheated steam to distill off unreacted monomers. A portion of the resulting aqueous colloidal dispersion of the copolymer was analyzed and found to contain 40 per cent by weight of solids. A 100 gram portion of the batch of the aqueous colloidal dispersion containing 40 per cent by weight of solids was stabilized by admixing therewith 1.6 cc. of an aqueous solution containing 10 per cent by weight of sodium azide, 1.6 cc. of an aqueous solution containing 10 per cent by weight of sodium bicarbonate and 0.4 cc. of an aqueous 28 per cent by weight solution of ammonium hydroxide. The stabilized aqueous colloidal dispersion was sealed in an 8 ounce black iron plate sheet metal can and stored at room temperature. After 110 days, no change in the aqueous colloidal dispersion was evident. Only a very slight corroding of interior surfaces of the can were observed. In contrast, when another portion of the batch of the aqueous colloidal dispersion of the copolymer, not containing the stabilizing ingredients, was stored in a black iron can, approximately 15 per cent of the copolymer was coagulated after storing for only 6 days.

*Example 2*

A charge of 70 parts by weight of styrene and 30 parts by weight of butadiene was mixed with 100 parts by weight of an aqueous solution containing 0.13 per cent by weight of Aquarex D as emulsifying agent, 0.09 per cent of sodium bicarbonate and 0.16 per cent of potassium persulfate as polymerization catalyst. The mixture was agitated in a closed vessel to effect emulsification and was heated at a temperature of 70° C. for 16 hours to polymerize the monomers. A synthetic latex was obtained. The latex was removed from the vessel and was treated with superheated steam to distill off unreacted monomers. The resulting latex was analyzed and found to contain 36.4 per cent by weight of solids. A solution of 50 parts by weight of monoethanolamine oleate and 50 parts of Formula 30 alcohol (a mixture of 90 parts by volume of 95 per cent ethanol and 10 parts by volume of methanol) was added to the latex in amount corresponding to 3 parts by weight of the monoethanolamine oleate per 100 parts of the latex solids. To a charge of 100 grams of the batch of the resulting latex there was added 1.5 cc. of an aqueous solution containing 10 per cent by weight of sodium azide, 0.4 cc. of an aqueous 28 per cent by weight solution of ammonium hydroxide and 3.6 cc. of an aqueous 10 per cent by weight solution of sodium bicarbonate as stabilizers. The stabilized latex was sealed in an 8 ounce black iron can and stored at room temperature. No change in the latex occurred after storing for a period of 110 days. Slight rusting of interior surfaces of the can above the liquid were observed. A similar charge of 100 grams of the batch of the latex was mixed with 3 cc. of the sodium azide solution, 0.8 cc. of the aqueous ammonium hydroxide and 7.2 cc. of the sodium bicarbonate solution. The stabilized latex was sealed in a black iron can and stored at room temperature. No change in the latex occurred after storing for 110 days and no rusting of interior surfaces of the can could be observed.

In contrast, when a charge of 100 grams of the latex without additions of the stabilizing ingredients, i. e. the sodium azide, the ammonium hydroxide and the sodium bicarbonate, is sealed in an 8 ounce black iron can and stored at room temperature, the latex is found to be more than 15 per cent coagulated after only 6 days.

Example 3

A charge of 35 pounds of styrene and 23 pounds of butadiene, together with 58.5 pounds of an aqueous solution containing 0.13 per cent by weight of Aquarex D as emulsifying agent, 0.09 per cent of sodium bicarbonate and 0.16 per cent of potassium persulfate as polymerization catalyst was sealed in an autoclave. The mixture was agitated to effect emulsification and was heated at a temperature of 70° C. for a period of approximately 8 hours to polymerize the monomers. The reaction mixture was removed from the autoclave and was treated with superheated steam to distill off the unreacted monomers. A synthetic latex was obtained. It was analyzed. The latex had a pH value of 8.2 and contained 43.5 per cent by weight of solids. A solution of 50 parts by weight of monoethanolamine oleate and 50 parts by weight of Formula 30 alcohol was added to the latex in amount corresponding to 3 parts by weight of the monoethanolamine oleate per 100 parts of the latex solids. To a charge of 100 grams of the batch of the resulting latex there was added 1.75 cc. of an aqueous 10 per cent by weight solution of sodium azide, 0.43 cc. of an aqueous 28 per cent solution of ammonium hydroxide and 4.3 cc. of an aqueous 10 per cent solution of potassium bicarbonate, as stabilizing ingredients. The stabilized latex was sealed in an 8 ounce black iron can and stored at room temperature. No change in the latex occurred after storing for a period of 110 days. Interior surfaces of the can were free from rust. In other tests employing 100 grams of the batch of the latex and the same proportion of sodium azide, but substituting potassium hydroxide, or sodium hydroxide, for the ammonium hydroxide, similar stabilization of the latex was obtained.

Example 4

A charge of 100 grams of a synthetic GRS latex type III (an aqueous colloidal dispersion containing 39 per cent by weight of a copolymer of approximately 50 per cent by weight of styrene and 50 percent of butadiene), was admixed with 0.48 gram of sodium bicarbonate, 0.48 gram of sodium azide and 0.48 gram of an aqueous 28 percent solution of ammonium hydroxide. The latter ingredients were added to the latex as an aqueous solution containing equal parts by weight of each of the ingredients in total concentration of 25 per cent by weight of the solution. The aqueous composition was sealed in an eight ounce black iron plate sheet metal can and was stored at room temperature. It had a pH value of 9.5. After storage for a period of 5 days the aqueous composition was examined. No change in the latex was observed and no corrosion of the interior surfaces of the container was evident. No plating out of solids was found after storing the aqueous composition for a period of seven months. Interior surfaces of the container were free from rust. In contrast, a charge of 100 grams of the batch of the untreated latex was found to be plating out and to have caused rusting of the container above the liquid level after being stored in a similar container for a period of only 5 days.

Example 5

An aqueous colloidal dispersion containing approximately 42 per cent by weight of polystyrene was prepared by mixing 100 parts by weight of styrene with 140 parts of an aqueous solution containing 1.5 per cent by weight of sodium stearate and 1 per cent of Lomar PW (sodium salt of naphthalene sulfonate) as emulsifying agents, 1 per cent of sodium orthophosphate ($Na_3PO_4.12H_2O$) and 0.7 per cent of potassium persulfate as polymerization catalyst. The mixture was sealed in a closed vessel and was agitated to effect emulsification, then heated at a temperature of 90° C. over a period of 16 hours to polymerize the styrene. The vessel was cooled and the aqueous colloidal dispersion removed. It had a pH value of 8.5. The aqueous colloidal dispersion was mixed with an aqueous 28 weight per cent solution of ammonium hydroxide in amount such as to bring the aqueous dispersion to a pH value of 10. A charge of 100 grams of the batch of the aqueous colloidal dispersion was mixed with 0.42 gram of sodium azide, 0.42 gram of sodium bicarbonate and 0.42 gram of an aqueous 28 weight per cent solution of ammonium hydroxide. The sodium azide was added as an aqueous solution containing 25 per cent by weight of the sodium azide. The sodium bicarbonate was added as an aqueous solution of 10 per cent concentration. The aqueous composition was sealed in an 8 ounce black iron container and was stored at room temperature. After 30 days the container was opened and the contents examined. The aqueous composition had a pH value of 10.6 and was free from coagulated particles. Interior surfaces of the metal container were free from rust or corrosion. For purpose of comparison, a charge of 100 grams of the batch of the aqueous polystyrene dispersion having a pH value of 10 was sealed in an 8 ounce black iron can and stored at room temperature. The aqueous composition was nearly all coagulated after being stored for only 3 days.

Example 6

A latex paint was prepared by mixing 438.2 grams of an aqueous colloidal dispersion containing approximately 45 per cent by weight of a copolymer of 60 per cent by weight of styrene and 40 per cent of butadiene-1,3, which aqueous colloidal dispersion was prepared by procedure similar to that described in Example 3, with 561.8 grams of a paste containing 231 grams of titanium dioxide, 65.8 grams of lithopone, 32.8 grams of mica (325 mesh), 12.5 grams of tributylphosphate, 3.9 grams of pine oil, 2.7 grams of tetrasodium pyrophosphate, 1.65 grams of sodium orthophenylphenate, 9.2 grams of alpha-protein and 202.25 grams of water. To a charge of 130 grams of the batch of the latex paint there was added 0.2 gram of sodium azide, 0.2 gram of sodium bicarbonate and 0.2 gram of an aqueous 28 weight per cent solution of ammonium hydroxide. The stabilizing ingredients were added as aqueous solutions of the same. The stabilized aqueous composition was sealed in a black iron container and was stored at room temperature. After 90 days the aqueous composition was unchanged, and no rusting or corroding of the container were evident. In contrast, a similar charge of 130 grams of the batch of the latex paint, without the stabilizing ingredients, was found to be nearly all coagulated and the container was badly rusted, after being stored in a black iron container for a period of only 3 days.

I claim:

1. A method which comprises stabilizing an aqueous colloidal dispersion of from 30 to 50 per cent by weight of a polymer composed of at least one polymerized unsaturated hydrocarbon selected from the group consisting of monovinyl aromatic hydrocarbons of the benzene series and mixtures of from 50 to 99 per cent by weight of at least one such monovinyl aromatic hydrocarbon and from 50 to 1 per cent of an aliphatic conjugated diolefin containing from 4 to 6 carbon atoms in the molecule, the said aqueous colloidal dispersion having a substantially neutral to alkaline pH value incident to its manufacture, by incorporating with said aqueous colloidal dispersion, based on the weight of the polymer, stabilizing proportions within the range of from 0.4 to 2 per cent of sodium azide, from 0.4 to 2 per cent of at least one alkali metal bicarbonate selected from the group consisting of sodium bicarbonate and potassium bicarbonate, and at least one alkali selected from the group consisting of ammonium hydroxide, sodium hydroxide and potassium hydroxide, in amount of at least 0.1 per cent, to form an aqueous composition having a pH value between 9 and 12.

2. A process, as claimed in claim 1, wherein the aqueous colloidal dispersion contains a homopolymer of a monovinyl aromatic hydrocarbon.

3. A process, as claimed in claim 1, wherein the aqueous colloidal dispersion contains a copolymer of from 50 to 99 per cent by weight of a monovinyl aromatic hydrocarbon and from 50 to 1 per cent of butadiene.

4. A method which comprises stabilizing an aqueous colloidal dispersion of from 30 to 50 per cent by weight of a copolymer of a major proportion of styrene and a minor proportion of butadiene, the said aqueous colloidal dispersion having a substantially neutral to alkaline pH value incident to its manufacture, by incorporating with the aqueous colloidal dispersion, based on the weight of the copolymer, stabilizing proportions within the range of from 0.4 to 2 per cent by weight of sodium azide, from 0.4 to 2 per cent of an alkali metal bicarbonate selected from the group consisting of sodium bicarbonate and potassium bicarbonate, and an alkali selected from the group consisting of ammonium hydroxide, sodium hydroxide and potassium hydroxide, in amount of at least 0.1 per cent to form an aqueous composition having a pH value between 9 and 12.

5. A stabilized aqueous composition comprising an aqueous colloidal dispersion of from 30 to 50 per cent by weight of a polymer of at least one polymerizable unsaturated hydrocarbon selected from the group consisting of monovinyl aromatic hydrocarbons of the benzene series and mixtures of a major proportion of at least one such monovinyl aromatic hydrocarbon and a minor proportion of an aliphatic conjugated diolefin containing from 4 to 6 carbon atoms in the molecule, the said aqueous colloidal dispersion having a substantially neutral to alkaline pH value incident to its manufacture, and having incorporated with said aqueous colloidal dispersion, based on the weight of the polymer stabilizing proportions within the range of from 0.4 to 2 per cent of sodium azide, from 0.4 to 2 per cent of at least one alkali metal bicarbonate selected from the group consisting of sodium bicarbonate and potassium bicarbonate, and at least 0.1 per cent of an alkali selected from the group consisting of ammonium hydroxide, sodium hydroxide and potassium hydroxide, to form an aqueous composition having a pH value between 9 and 12.

6. A stabilized aqueous composition as claimed in claim 5, wherein the aqueous colloidal dispersion contains a homopolymer of a monovinyl aromatic hydrocarbon.

7. A stabilized aqueous composition as described in claim 5, wherein the aqueous colloidal dispersion contains a copolymer of a major proportion of a monovinyl aromatic hydrocarbon and a minor proportion of butadiene.

8. A stabilized aqueous composition comprising an aqueous colloidal dispersion of from 30 to 50 per cent by weight of a copolymer of a major proportion of styrene and a minor proportion of butadiene, the said aqueous colloidal dispersion having a substantially neutral to alkaline pH value incident to its manufacture, and having incorporated therewith as the essential stabilizing ingredients, based on the weight of the copolymer, stabilizing proportions within the range of from 0.4 to 2 per cent by weight of sodium azide, from 0.4 to 2 per cent of an alkali metal bicarbonate selected from the group consisting of sodium bicarbonate and potassium bicarbonate and at least 0.1 per cent of an alkali selected from the group consisting of ammonium hydroxide, sodium hydroxide and potassium hydroxide, to form an aqueous composition having a pH value between 9 and 12.

9. A stabilized aqueous composition comprising an aqueous colloidal dispersion of from 30 to 50 per cent by weight of a copolymer of from 50 to 99 per cent by weight of styrene and from 50 to 1 per cent of butadiene-1,3, and having a substantially neutral to alkaline pH value incident to its manufacture, which aqueous colloidal dispersion has incorporated therewith, based on the weight of the copolymer, stabilizing proportions within the range of from 0.4 to 2 per cent by weight of sodium azide, from 0.4 to 2 per cent of sodium bicarbonate and at least 0.1 per cent of ammonium hydroxide to form an aqueous composition having a pH value between 9 and 12.

References Cited in the file of this patent

UNITED STATES PATENTS

| Number | Name | Date |
|---|---|---|
| 2,447,878 | Rust | Aug. 24, 1948 |